(12) United States Patent
Takimoto et al.

(10) Patent No.: US 10,415,211 B2
(45) Date of Patent: Sep. 17, 2019

(54) HYDRAULIC EXCAVATOR HAVING HANDRAIL AND CAMERA

(71) Applicant: KOMATSU LTD., Tokyo (JP)

(72) Inventors: Mitsuyuki Takimoto, Komatsu (JP); Asami Iwamoto, Komatsu (JP)

(73) Assignee: KOMATSU LTD., Tokyo (JP)

( * ) Notice: Subject to any disclaimer, the term of this patent is extended or adjusted under 35 U.S.C. 154(b) by 54 days.

(21) Appl. No.: 15/039,556

(22) PCT Filed: Feb. 23, 2015

(86) PCT No.: PCT/JP2015/055000
§ 371 (c)(1),
(2) Date: May 26, 2016

(87) PCT Pub. No.: WO2016/038905
PCT Pub. Date: Mar. 17, 2016

(65) Prior Publication Data
US 2017/0159262 A1    Jun. 8, 2017

(51) Int. Cl.
*E02F 9/08* (2006.01)
*E02F 9/26* (2006.01)
(Continued)

(52) U.S. Cl.
CPC .............. *E02F 3/32* (2013.01); *E02F 9/0833* (2013.01); *E02F 9/0858* (2013.01);
(Continued)

(58) Field of Classification Search
CPC ......... E02F 3/32; E02F 9/0833; E02F 3/0858; E02F 3/0883; E02F 3/22; E02F 3/26;
(Continued)

(56) References Cited

U.S. PATENT DOCUMENTS

| 8,982,212 B2 * | 3/2015 | Mitsuta | B60R 1/00 348/148 |
| 2003/0085995 A1 * | 5/2003 | Sawada | H04N 7/183 348/118 |

(Continued)

FOREIGN PATENT DOCUMENTS

| CN | 101233042 A | 7/2008 |
| CN | 103703190 A | 4/2014 |

(Continued)

*Primary Examiner* — Barry Gooden, Jr.
(74) *Attorney, Agent, or Firm* — Drinker Biddle & Reath LLP (57) ABSTRACT

Provided is a hydraulic excavator that enables arrangement of a camera at an appropriate position on a lateral edge of a revolving unit. The camera is installed on the lateral edge of the upper surface of the revolving unit. A handrail is attached to the upper surface of the revolving unit. The handrail includes a first handrail member extending in the front-rear direction of the revolving unit, and a first support member supporting the first handrail member on the revolving unit. The camera and the first support member are adjacent to each other in the right-left direction of the revolving unit, and the first support member is arranged inward relative to the camera.

6 Claims, 7 Drawing Sheets

(51) Int. Cl.
*E02F 3/32* (2006.01)
*H04N 7/18* (2006.01)
*E02F 9/22* (2006.01)

(52) U.S. Cl.
CPC .............. *E02F 9/0883* (2013.01); *E02F 9/22* (2013.01); *E02F 9/261* (2013.01); *H04N 7/183* (2013.01)

(58) Field of Classification Search
CPC . E02F 3/261; E02F 9/08; H04N 7/183; B60R 3/005
See application file for complete search history.

(56) References Cited

U.S. PATENT DOCUMENTS

| | | | |
|---|---|---|---|
| 2009/0166117 A1 | 7/2009 | Hokimoto | |
| 2013/0140092 A1* | 6/2013 | Warr | E21B 7/02 175/219 |
| 2013/0155240 A1* | 6/2013 | Mitsuta | B60R 1/00 348/148 |
| 2013/0182066 A1 | 7/2013 | Ishimoto | |
| 2014/0017054 A1 | 1/2014 | Motozu et al. | |
| 2014/0118533 A1* | 5/2014 | Chang | B60R 1/00 348/118 |
| 2015/0077281 A1* | 3/2015 | Taniguchi | B60R 1/00 342/27 |
| 2015/0217691 A1* | 8/2015 | Tanuki | E02F 9/261 348/148 |
| 2016/0002884 A1 | 1/2016 | Nakamura | |
| 2016/0114837 A1* | 4/2016 | Iwahashi | E02F 9/0858 296/190.08 |
| 2016/0129844 A1* | 5/2016 | Magnussen | B60R 3/005 280/760 |
| 2016/0237655 A1* | 8/2016 | Baba | E02F 3/437 |
| 2016/0251836 A1* | 9/2016 | Baba | E02F 3/435 701/50 |
| 2017/0107698 A1* | 4/2017 | Yamaguchi | E02F 9/26 |
| 2017/0190293 A1* | 7/2017 | Koga | B60R 3/005 |

FOREIGN PATENT DOCUMENTS

| | | |
|---|---|---|
| JP | H10-072851 A | 3/1998 |
| JP | 2007-327190 A | 12/2007 |
| JP | 2008-240278 A | 10/2008 |
| JP | 2012-074929 A | 4/2012 |
| JP | 2012-112108 A | 6/2012 |
| JP | 2014-047564 A | 3/2014 |
| JP | 5629015 B1 | 11/2014 |
| JP | 2015-021320 A | 2/2015 |
| KR | 10-2000-0006130 A | 1/2000 |
| KR | 10-2001-0006953 A | 1/2001 |
| KR | 10-2013-0138227 A | 12/2013 |

* cited by examiner

HYDRAULIC EXCAVATOR HAVING HANDRAIL AND CAMERA

TECHNICAL FIELD

The present invention relates to a hydraulic excavator.

BACKGROUND ART

A hydraulic excavator provided with a handrail which extends from the front end of a right side portion of a revolving unit toward the rear side of the revolving unit has been proposed (see for example Japanese Patent No. 5629015 (PTD 1)).

A hydraulic excavator has also been proposed in which a cab is installed on the left front side of a revolving unit and a camera is provided at a position on the right side of the revolving unit so as to enable monitoring of an area at the right side of the revolving unit (see for example Japanese Patent Laying-Open No. 2012-112108 (PTD 2)).

CITATION LIST

Patent Document

PTD 1: Japanese Patent No. 5629015
PTD 2: Japanese Patent Laying-Open No. 2012-112108

SUMMARY OF INVENTION

Technical Problem

In the case where both the handrail and the camera are installed on a lateral edge of the upper surface of the revolving unit, arrangement of the camera may be restricted by the handrail. Then, the camera cannot be arranged at an appropriate position, and monitoring of an area at the lateral side of the revolving unit could be insufficient.

An object of the present invention is to provide a hydraulic excavator that enables a camera to be arranged at an appropriate position on a lateral edge of a revolving body.

Solution to Problem

A hydraulic excavator of the present invention includes a revolving unit, a camera, and a handrail. The camera is installed on a lateral edge of an upper surface of the revolving unit. The handrail is attached to the upper surface of the revolving unit. The handrail includes a first handrail member extending in a front-rear direction of the revolving unit, and a first support member supporting the first handrail member on the revolving unit. The camera and the first support member are adjacent to each other in a right-left direction of the revolving unit, and the first support member is arranged inward relative to the camera.

As to the hydraulic excavator of the present invention, the camera can be arranged in a space located outside the first support member. Therefore, arrangement of the camera is not restricted by the first support member. Accordingly, the camera can be arranged at an appropriate position on the lateral edge of the revolving unit.

Regarding the hydraulic excavator, the handrail includes a second handrail member arranged below the first handrail member and extending in the front-rear direction of the revolving unit, and a second support member supporting the second handrail member on the revolving unit. The camera and the second support member are adjacent to each other in the front-rear direction of the revolving unit, and the second support member is arranged frontward relative to the camera. In this way, the camera can be arranged in a space located rearward of the second support member, and arrangement of the camera is therefore not restricted by the second support member. Accordingly, the camera can be arranged at an appropriate position on the lateral edge of the revolving unit.

Regarding the hydraulic excavator, the revolving unit includes a fuel tank for storing fuel. The first support member, the second support member, and the camera are arranged on an upper surface of the fuel tank. As the first support member, the second support member, and the camera are all arranged in a concentrated manner on the upper surface of the fuel tank, a space for arranging the camera can easily be formed.

Regarding the hydraulic excavator, the revolving unit includes a hydraulic oil tank for storing hydraulic oil. The fuel tank includes a fuel replenishment port. The hydraulic oil tank includes a hydraulic oil replenishment port. The first support member, the second support member, and the camera are arranged between the fuel replenishment port and the hydraulic oil replenishment port in the front-rear direction of the revolving unit. As the first support member, the second support member, and the camera are arranged in a concentrated manner between the fuel replenishment port and the hydraulic oil replenishment port, the fuel replenishment port and the hydraulic oil replenishment port can be arranged away from both the first support member and the second support member.

Regarding the hydraulic excavator, the revolving unit includes a mount member attached to the upper surface of the fuel tank. The camera is mounted on the mount member. The revolving unit includes an exterior cover laterally covering the fuel tank. The exterior cover and the mount member overlap each other as seen in lateral view. As the camera is mounted on the mount member, a broad area at the right side of the revolving unit can be monitored. The fact that the mount member is invisible as seen in lateral view enables the design of the hydraulic excavator to be improved.

Regarding the hydraulic excavator, the first handrail member and the second handrail member overlap each other as seen in plan view. Accordingly, the access passage for an operator can be formed to be broader.

Advantageous Effects of Invention

As described above, according to the present invention, the camera can be arranged at an appropriate position on a lateral edge of the revolving unit.

DESCRIPTION OF EMBODIMENTS

In the following, embodiments of the present invention will be described based on the drawings.

A description will first be given of a configuration of a hydraulic excavator to which the concept of the present invention is applicable.

Figure 1:
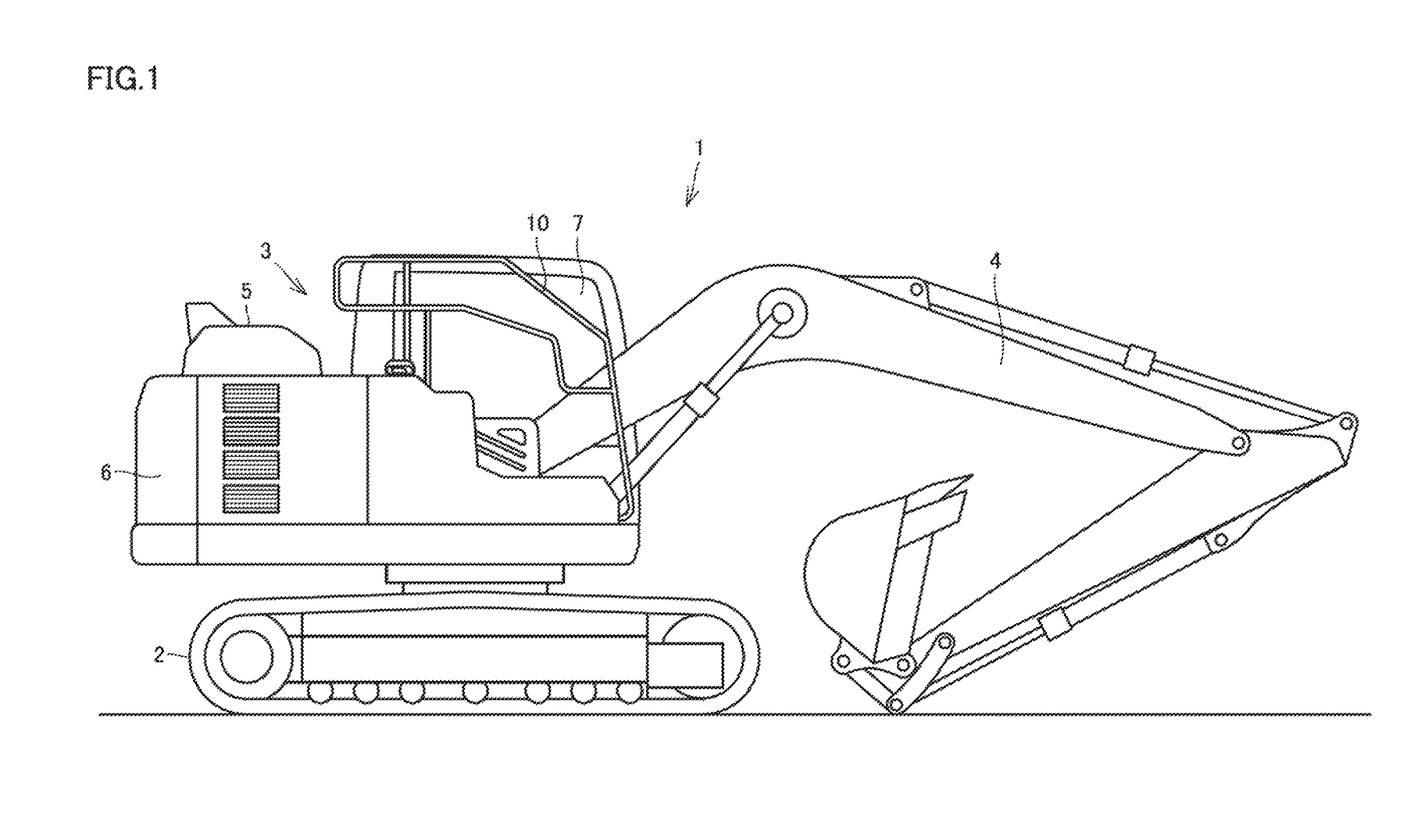
FIG. 1 is a side view showing a configuration of a hydraulic excavator according to one embodiment of the present invention.

FIG. 1 is a side view showing a configuration of a hydraulic excavator 1 according to one embodiment of the present invention. As shown in FIG. 1, hydraulic excavator 1 of the present embodiment chiefly includes a travelling unit 2, a revolving unit 3, and a work implement 4. The body of the hydraulic excavator is chiefly made up of travelling unit 2 and revolving unit 3.

Travelling unit 2 is configured so that it can be self-propelled by rotation of a pair of crawler belts. Revolving unit 3 is mounted on travelling unit 2 so that revolving unit 3 can revolve in any direction with respect to travelling unit 2. Revolving unit 3 includes a cab 7 which is an operator's compartment that an operator of hydraulic excavator 1 gets in and off. Revolving unit 3 includes an engine compartment 5 and a counterweight 6 in its rear portion.

Work implement 4 for performing a work such as excavation of earth and sand is attached to the front side of revolving unit 3 so that work implement 4 is operable in the top-bottom direction. In order for an operator riding in cab 7 to see the leading end of work implement 4, work implement 4 is provided rightward with respect to cab 7. Work implement 4 is configured to be driven by a hydraulic cylinder.

Counterweight 6 is a weight arranged in a rear portion of revolving unit 3 in order to balance the body of the excavator during digging and the like. In engine compartment 5 in a rear portion of revolving unit 3, an engine is housed.

Cab 7 is arranged on the left front side of revolving unit 3. On the lateral edge of revolving unit 3 that is the right side opposite to cab 7, a handrail 10 is attached. Handrail 10 extends from the front end of revolving unit 3 toward the rear side thereof. Handrail 10 extends in the front-rear direction of revolving unit 3.

In the present embodiment, with respect to an operator sitting in cab 7, the frontward side (front side) of the operator is defined as the frontward side of revolving unit 3, the rearward side of the operator is defined as the rearward side of revolving unit 3, the left side of the operator in the sitting state is defined as the left side of revolving unit 3, and the right side of the operator in the sitting state is defined as the right side of revolving unit 3. In the following description, it is supposed that the front, rear, left, and right of revolving unit 3 are identical to the front, rear, left, right, of hydraulic excavator 1.

Figure 2:
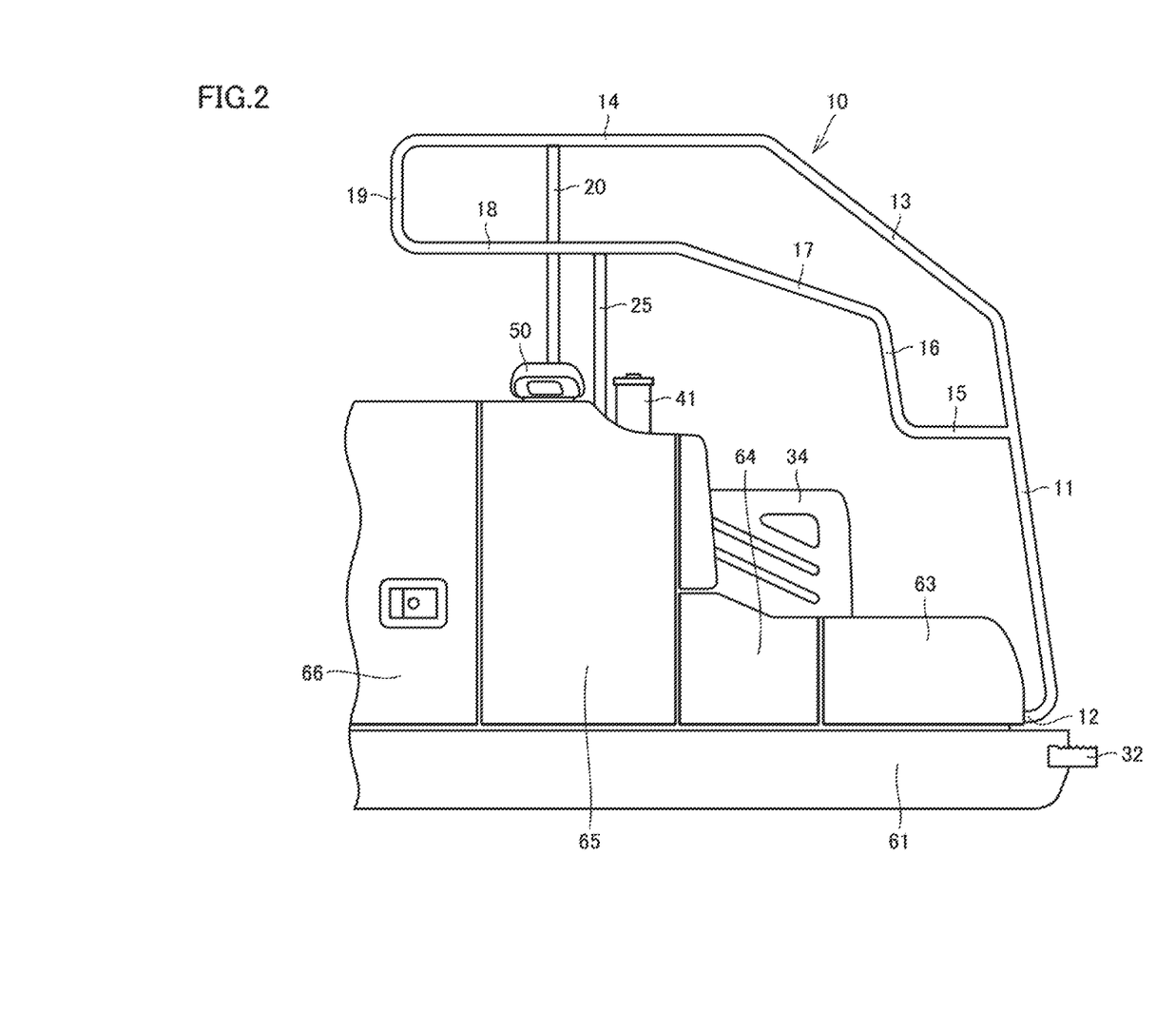
FIG. 2 is a side view showing, in an enlarged form, a part of the configuration of the hydraulic excavator shown in FIG. 1.

FIG. 2 is a side view showing, in an enlarged form, a part of the configuration of hydraulic excavator 1 shown in FIG. 1. As shown in FIG. 2, hydraulic excavator 1 includes exterior covers 61 and 63 to 66 forming the exterior of hydraulic excavator 1 as seen from the right.

Exterior cover 61 laterally covers a revolving frame on which components such as engine compartment 5, counterweight 6, and cab 7 shown in FIG. 1 are mounted. Exterior cover 63 laterally covers a tool box. Exterior cover 64 laterally covers a reducing agent tank for storing a reducing agent. Exterior cover 65 laterally covers a fuel tank for storing fuel. Exterior cover 66 laterally covers a hydraulic oil tank for storing hydraulic oil.

A step 32 is provided to protrude forward from the front end of exterior cover 61. Together with a reducing agent tank cover 34, exterior cover 64 forms a tank housing space in which the reducing agent tank is housed. The upper surface of fuel tank 35 covered with exterior cover 65 is provided with a fuel replenishment port 41 and a camera 50.

Exterior cover 63 and exterior cover 64 are formed so that respective upper edges are located substantially at the same position in the top-bottom direction. The fact that the upper edge of exterior cover 63 and the upper edge of exterior cover 64 appear to be aligned as seen in lateral view enables the design of hydraulic excavator 1 to be improved. Exterior cover 65 and exterior cover 66 are formed so that respective upper edges are located substantially at the same position in the top-bottom direction. The fact that the upper edge of exterior cover 65 and the upper edge of exterior cover 66 appear to be aligned as seen in lateral view enables the design of hydraulic excavator 1 to be improved. Camera 50 is arranged to protrude upward from the upper edge of exterior cover 65.

Handrail 10 includes a first rise portion 11. First rise portion 11 has, at its lower end, an attachment portion 12. By way of attachment portion 12, first rise portion 11 is attached and fixed to revolving unit 3. Attachment portion 12 is fixed to the front edge of the revolving frame of revolving unit 3. At the front end of revolving unit 3, first rise portion 11 rises upward from attachment portion 12 located at the lower end, and extends to incline slightly rearward as it approaches the upper end.

Handrail 10 also includes a first oblique portion 13 and a first parallel portion 14. First oblique portion 13 and first parallel portion 14 form a first handrail member for an operator to grip in a hand. The first handrail member extends in the front-rear direction of revolving unit 3.

First oblique portion 13 is coupled to the upper end of first rise portion 11. First oblique portion 13 extends upward and rearward from the upper end of first rise portion 11. First oblique portion 13 extends to incline with respect to the revolving frame. In the state where hydraulic excavator 1 is arranged so that the revolving frame extends horizontally, first oblique portion 13 extends to incline with respect to both the vertical direction (top-bottom direction) and the horizontal direction.

First parallel portion 14 is coupled to the upper end (or rear end) of first oblique portion 13. First parallel portion 14 extends rearward from the upper end of first oblique portion 13. First parallel portion 14 extends in parallel with the revolving frame.

Handrail 10 also includes a front coupling portion 15, a second rise portion 16, a second oblique portion 17, and a second parallel portion 18. The front end of front coupling portion 15 is coupled to an intermediate portion between the upper end and the lower end of first rise portion 11. Front coupling portion 15 extends in parallel with the revolving frame.

Second rise portion 16 is coupled to the rear end of front coupling portion 15. Second rise portion 16 rises upward from the rear end of front coupling portion 15, and extends to incline slightly rearward as it approaches the upper end. Second rise portion 16 extends in parallel with first rise portion 11.

Second oblique portion 17 is coupled to the upper end of second rise portion 16. Second oblique portion 17 extends upward and rearward from the upper end of second rise portion 16. Second oblique portion 17 extends to incline with respect to the revolving frame. In the state where hydraulic excavator 1 is arranged so that the revolving frame extends horizontally, second oblique portion 17 extends to incline with respect to both the vertical direction (top-bottom direction) and the horizontal direction. Second oblique portion 17 extends in non-parallel with first oblique portion 13.

Second parallel portion 18 is coupled to the upper end (or rear end) of second oblique portion 17. Second parallel portion 18 extends rearward from the upper end of second oblique portion 17. Second parallel portion 18 extends in parallel with the revolving frame.

Front coupling portion 15, second rise portion 16, second oblique portion 17, and second parallel portion 18 form a second handrail member for an operator to grip in a hand. The second handrail member is arranged below first oblique portion 13 and first parallel portion 14 which form the first handrail member. The second handrail member is entirely arranged closer to the revolving frame, relative to the first handrail member. The second handrail member extends in the front-rear direction of revolving unit 3.

Handrail 10 also includes a rear coupling portion 19. Rear coupling portion 19 has an upper end coupled to the rear end of first parallel portion 14 and a lower end coupled to the rear end of second parallel portion 18. Rear coupling portion 19 extends in the top-bottom direction. Rear coupling portion 19 extends vertically to the revolving frame.

Handrail 10 also includes a first support member 20 and a second support member 25. First support member 20 extends downward from first parallel portion 14 of the first handrail member. Second support member 25 extends downward from second parallel portion 18 of the second handrail member. First support member 20 and second support member 25 extend in the top-bottom direction. First support member 20 and second support member 25 extend vertically to the revolving frame.

Figure 3:
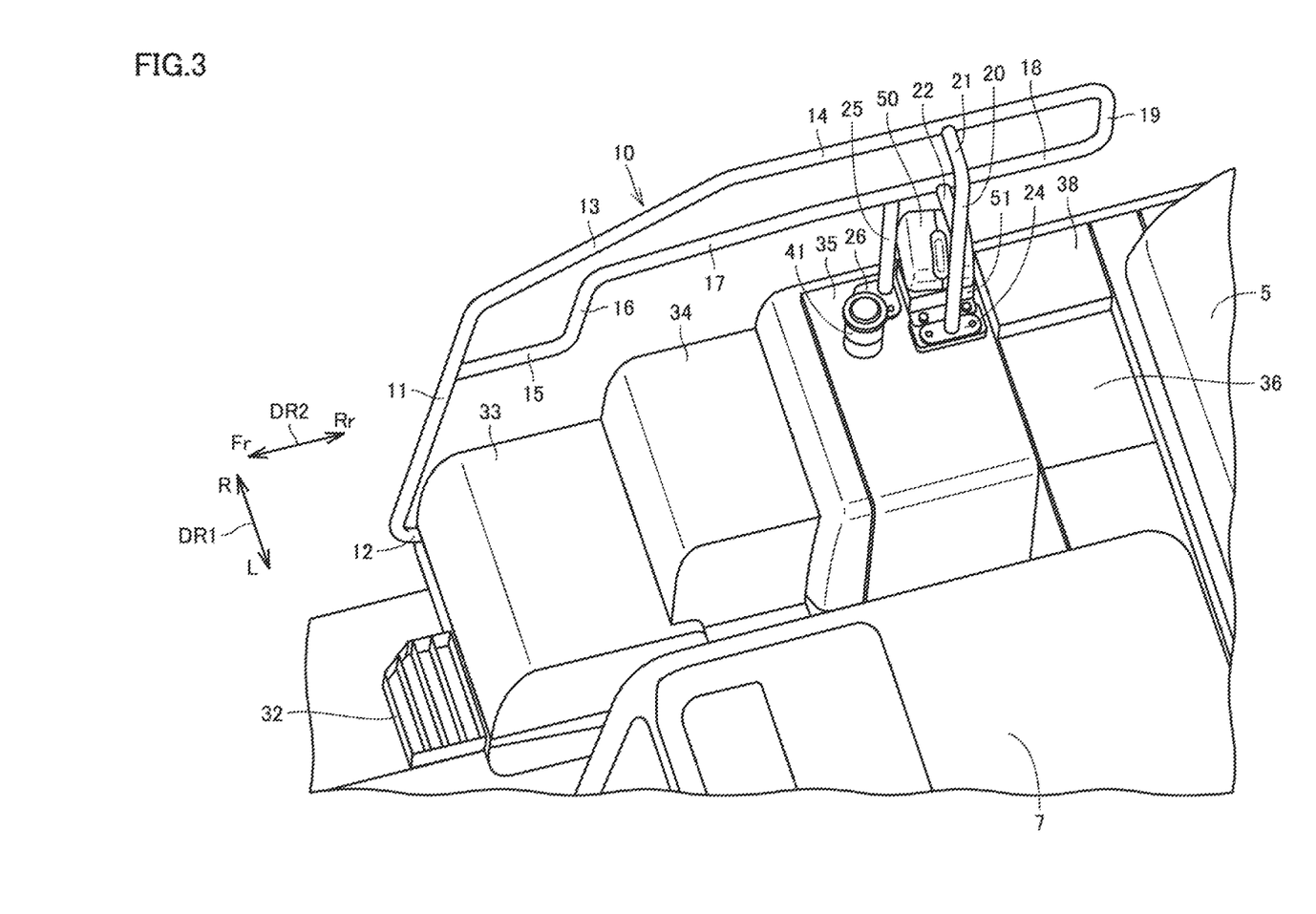
FIG. 3 is a perspective view showing a part of the configuration of the hydraulic excavator shown in FIG. 1.
Figure 4:
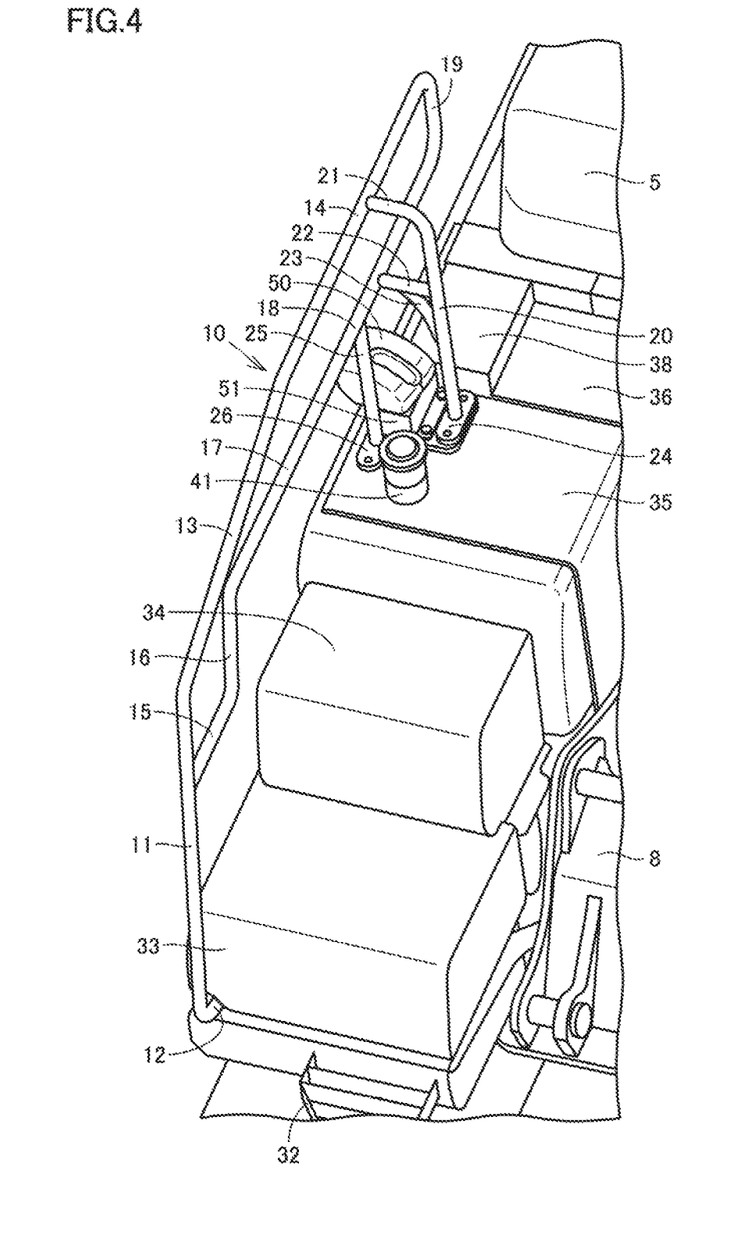
FIG. 4 is a perspective view, seen at a different angle from FIG. 3, of the part of the configuration of the hydraulic excavator shown in FIG. 1.

FIG. 3 is a perspective view showing a part of the configuration of the hydraulic excavator shown in FIG. 1. FIG. 4 is a perspective view, seen at a different angle from FIG. 3, of the part of the configuration of the hydraulic excavator shown in FIG. 1. FIG. 3 shows a double-headed arrow DR1 indicating the right-left direction of revolving unit 3, and a double-headed arrow DR2 indicating the front-rear direction of revolving unit 3. The R direction indicated by double-headed arrow DR1 represents the right direction, and the L direction indicated thereby represents the left direction. The Fr direction indicated by double-headed arrow DR2 represents the front direction, and the Rr direction indicated thereby represents the rear direction.

As shown in FIGS. 3 and 4, revolving unit 3 includes a tool box 33. The right side of tool box 33 is covered with exterior cover 63 shown in FIGS. 1 and 2. In tool box 33, various tools for maintaining and repairing hydraulic excavator 1 are contained. Tool box 33 is arranged on the right front side of revolving unit 3. At the rear side of tool box 33, reducing agent tank cover 34 which is also shown in FIG. 2 is arranged.

At the rear side of reducing agent tank cover 34, fuel tank 35 is arranged. The right side of fuel tank 35 is covered with exterior cover 65 shown in FIGS. 1 and 2. Fuel tank 35 stores fuel to be supplied to the engine (not shown) housed in engine compartment 5 (FIG. 1). Fuel tank 35 includes fuel replenishment port 41 for replenishing fuel tank 35 with fuel. Fuel replenishment port 41 is provided in the upper surface of fuel tank 35.

To the upper surface of fuel tank 35, a mount member 51 is also attached 51. Mount member 51 is arranged at an edge portion of fuel tank 35 that is located on the right side which is one lateral side of fuel tank 35. Camera 50 is mounted on mount member 51. Camera 50 is attached to the upper surface of fuel tank 35 with mount member 51 interposed therebetween.

Camera 50 is arranged to face rightward of revolving unit 3. Camera 50 is arranged so that its field of view is directed obliquely downward from the upper surface of revolving unit 3. Camera 50 captures an image of an area at the right side of revolving unit 3. At a position located frontward of an operator's seat on which an operator sits in cab 7, a display is installed. The image captured by camera 50 is displayed on the display. While sitting in cab 7, the operator can monitor an area at the right side of revolving unit 3 by seeing the display. In this way, the operator in cab 7 can confirm safety of the area at the right side of revolving unit 3.

Mount member 51 overlaps exterior cover 65 as seen in the right-left direction of revolving unit 3. Exterior cover 65 covers the right side of mount member 51, and mount member 51 is hidden by exterior cover 65 and thus invisible, as seen in lateral view as shown in FIG. 2. Therefore, mount member 51 is not shown in FIG. 2.

At the lower end of first support member 20 of handrail 10, a flat-plate-like attachment portion 24 is provided. Attachment portion 24 is attached to the upper surface of fuel tank 35 with bolts or the like. Thus, first support member 20 is fixed to the upper surface of fuel tank 35.

Handrail 10 includes lateral extensions 21, 22 extending in the right-left direction. One end of lateral extension 21 is coupled to first parallel portion 14 of the first handrail member. The other end of lateral extension 21 is curved downward and coupled to the upper end of first support member 20. One end of lateral extension 22 is coupled to second parallel portion 18 of the second handrail member. The other end of lateral extension 22 is coupled to an intermediate portion between the upper end and the lower end of first support member 20.

Handrail 10 includes a lateral oblique portion 23. Lateral oblique portion 23 has a plate-like shape. Lateral oblique portion 23 is provided to extend between lateral extension 22 and first support member 20. At a position below the position where lateral extension 22 is coupled to first support member 20, lateral oblique portion 23 is coupled to first support member 20.

To the lower end of second support member 25 of handrail 10, a flat-plate-like attachment portion 26 is provided. Attachment portion 26 is attached to the upper surface of fuel tank 35 with bolts or the like. Thus, second support member 25 is fixed to the upper surface of fuel tank 35.

In the right-left direction of revolving unit 3, attachment portion 26 is arranged outward relative to attachment portion 24. In the front-rear direction of revolving unit 3, attachment portion 26 is arranged frontward relative to attachment portion 24. Attachment portions 24 and 26 are displaced from each other in both the front-rear direction and the right-left direction of revolving unit 3. Therefore, first support member 20 and second support member 25 are displaced from each other in both the front-rear direction and right-left direction of revolving unit 3, and arranged at a distance from each other in both the front-rear direction and the right-left direction of revolving unit 3.

The upper end of second support member 25 is coupled to second parallel portion 18 of the second handrail member. The position where second support member 25 is coupled to second parallel portion 18 is located frontward relative to the position where lateral extension 22 is coupled to second parallel portion 18.

One end of lateral extension 21 is coupled to an intermediate portion between the front end and the rear end of first parallel portion 14. One end of lateral extension 22 is coupled to an intermediate portion between the front end and the rear end of second parallel portion 18. The upper end of second support member 25 is coupled to an intermediate portion between the front end and the rear end of second parallel portion 18. First parallel portion 14 extends rearward of revolving unit 3, relative to first support member 20 and second support member 25. Second parallel portion 18 extends rearward of revolving unit 3, relative to first support member 20 and second support member 25. Rear coupling portion 19 coupling first parallel portion 14 to second parallel portion 18 is arranged rearward of revolving unit 3, relative to first support member 20 and second support member 25.

At the rear side of fuel tank 35, a hydraulic oil tank cover 36 covering the hydraulic oil tank is arranged. The right side of the hydraulic oil tank is covered with exterior cover 66 shown in FIGS. 1 and 2. The hydraulic oil tank stores hydraulic oil to be supplied to a hydraulic actuator such as hydraulic cylinder for driving work implement 4 shown in FIG. 1. The upper surface of fuel tank 35 and the upper surface of hydraulic oil tank cover 36 are substantially coplanar with each other.

To hydraulic oil tank cover 36, a lid 38 is attached. Lid 38 is provided to be attachable to and detachable from the cover. Lid 38 protrudes upward from the upper surface of hydraulic oil tank cover 36. Lid 38 protrudes upward, with respect to the upper surface of fuel tank 35. As will be described later herein, removal of lid 38 causes a part of the hydraulic oil tank to be exposed outward.

As seen in the right-left direction of revolving unit 3, lid 38 overlaps exterior cover 66. Exterior cover 66 covers the right side of hydraulic oil tank cover 36 and the right side of lid 38. As seen in lateral view shown in FIG. 2, lid 38 is hidden by exterior cover 66 and thus invisible. Lid 38 is therefore not shown in FIG. 2.

Tool box 33, reducing agent tank cover 34, and fuel tank 35 form a stair-like shape. With feet placed alternately on step 32, the upper surface of tool box 33, and the upper surface of reducing agent tank cover 34 in this order, an operator can easily access the upper surface of fuel tank 35 and the upper surface of hydraulic oil tank cover 36. Accordingly, the operator can easily and safely replenish fuel tank 35 with fuel, replenish the hydraulic oil tank with hydraulic oil, and carry out maintenance work such as checking of various devices in engine compartment 5.

Handrail 10 is provided rightward with respect to the access passage extending from step 32 to the upper surface of hydraulic oil tank cover 36. Both the first handrail member and the second handrail member of handrail 10 extend in the front-rear direction from the front end portion of revolving unit 3 to above hydraulic oil tank cover 36. An operator can lightly hold the first handrail member or the second handrail member of handrail 10 in a hand and move while sliding the hand, to easily get on and off the upper surface of revolving unit 3.

As shown in FIG. 4, at the front end of a central portion in the right-left direction of revolving unit 3, a center bracket 8 is provided. The proximal end of work implement 4 shown in Fig. I is attached to center bracket 8. Center bracket 8 supports work implement 4 of hydraulic excavator 1 and forms an attachment portion of work implement 4.

Figure 5:
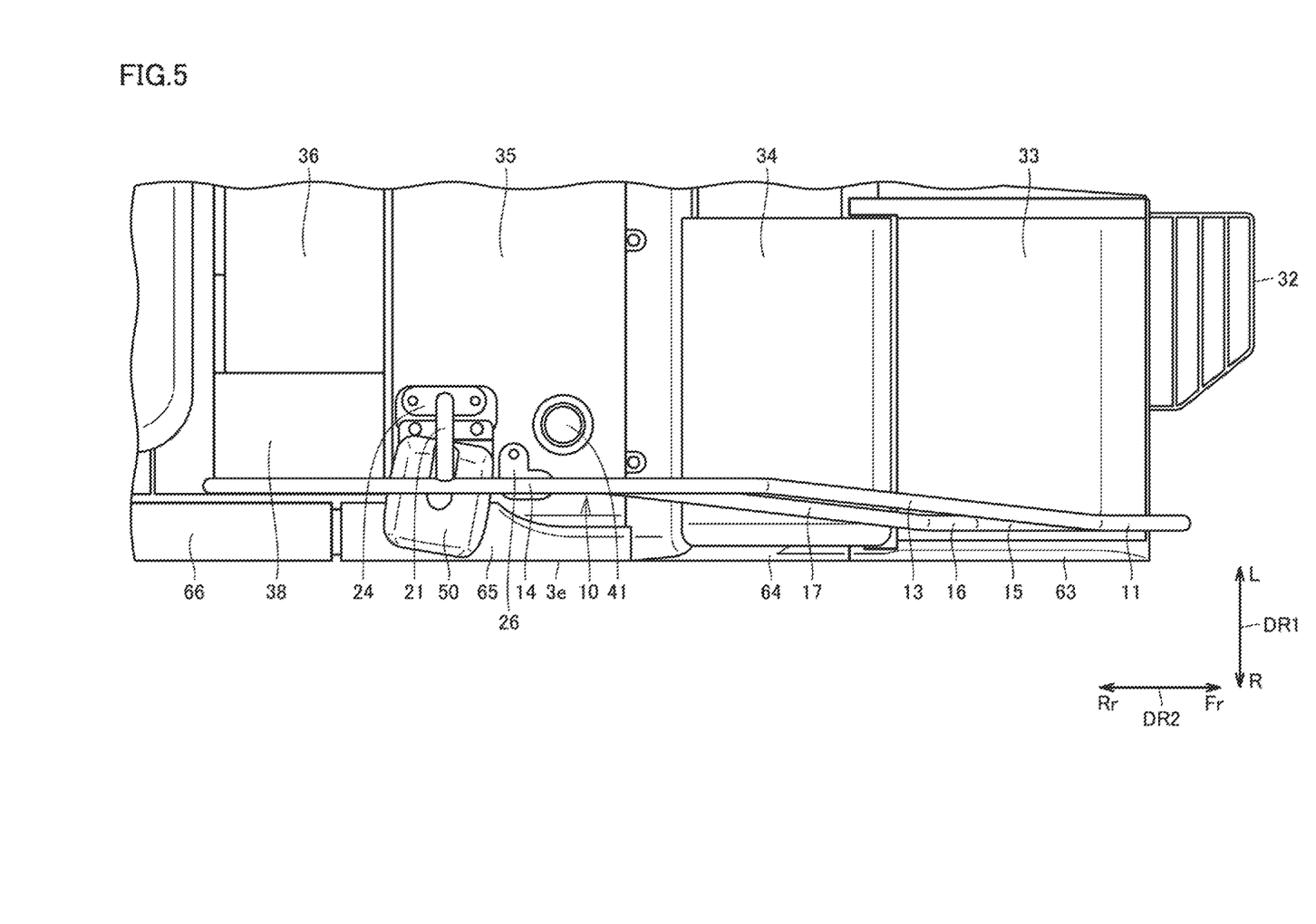
FIG. 5 is a plan view showing a part of the configuration of the hydraulic excavator shown in FIG. 1.

FIG. 5 is a plan view showing a part of the configuration of hydraulic excavator 1 shown in FIG. 1. In FIG. 5, tool box 33, reducing agent tank cover 34, fuel tank 35, and hydraulic oil tank cover 36 which are described above with reference to FIGS. 3 and 4 are illustrated in plan view.

At the right side of tool box 33, exterior cover 63 is arranged. At the right side of reducing agent tank cover 34, exterior cover 64 is arranged. At the right side of fuel tank 35, exterior cover 65 is arranged. At the right side of hydraulic oil tank cover 36, exterior cover 66 is arranged.

In the plan view shown in FIG. 5, first parallel portion 14 which forms the first handrail member overlaps second parallel portion 18 which forms the second handrail member. Second parallel portion 18 is arranged directly below first parallel portion 14. In the plan view shown in FIG. 5, second parallel portion 18 is hidden by first parallel portion 14 and thus invisible. Second parallel portion 18 is therefore not shown in FIG. 5.

First rise portion 11, first parallel portion 14, front coupling portion 15, second rise portion 16, and second parallel portion 18, which is not shown in FIG. 5, form handrail 10, and they extend in the front-rear direction of revolving unit 3. In contrast, first oblique portion 13 and second oblique portion 17 extend obliquely with respect to the front-rear direction of revolving unit 3. First oblique portion 13 inclines with respect to the front-rear direction so as to extend leftward of revolving unit 3 as it extends from the front end toward the rear end. Second oblique portion 17 inclines with respect to the front-rear direction so as to extend leftward of revolving unit 3 as it extends from the front end toward the rear end. First oblique portion 13 and second oblique portion 17 extend to incline with respect to the front-rear direction of revolving unit 3.

Handrail 10 entirely extends along a lateral edge 3e on the right side of revolving unit 3. In the right-left direction indicated by double-headed arrow DR1, the dimension of exterior covers 65, 66 is larger than the dimension of exterior covers 63, 64. Relative to respective right edges of tool box 33 and reducing agent tank cover 34, respective right edges of fuel tank 35 and hydraulic oil tank cover 36 are arranged further from right-side lateral edge 3e of revolving unit 3. First rise portion 11 extends along the right edge of tool box 33. First parallel portion 14 and second parallel portion 18 which is not shown in FIG. 5 extend along respective right edges of fuel tank 35 and hydraulic oil tank cover 36.

Figure 6:
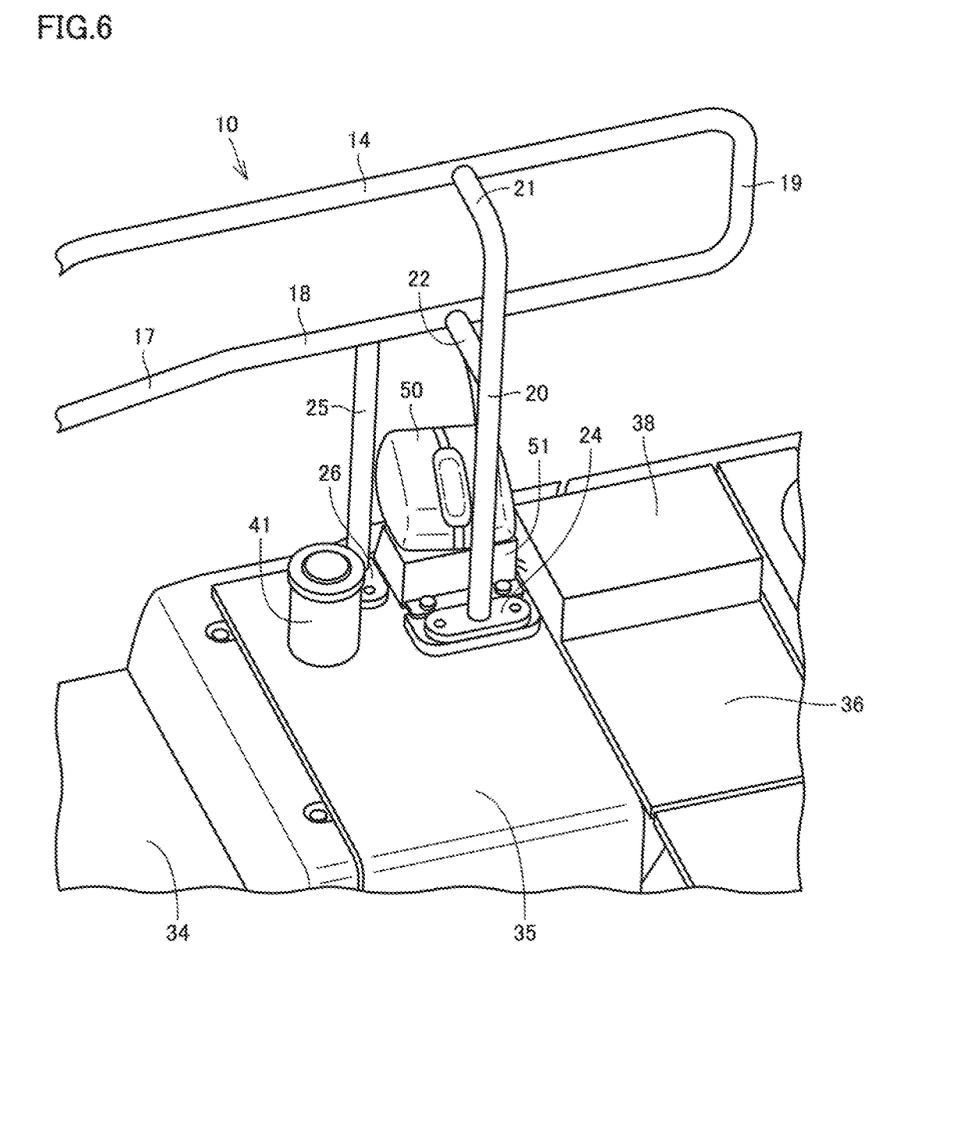
FIG. 6 is a perspective view showing a camera and its periphery in an enlarged form.

FIG. 6 is a perspective view showing camera 50 and its periphery in an enlarged form. As shown in FIGS. 5 and 6, mount member 51 on which camera 50 is mounted and attachment portion 24 for attaching first support member 20 of handrail 10 to fuel tank 35 are arranged to be adjacent to each other in the right-left direction of revolving unit 3. Mount member 51 is arranged closer to the right edge of fuel tank 35, relative to attachment portion 24. Relative to mount member 51, attachment portion 24 is arranged further from the right edge of revolving unit 3, and located inward of revolving unit 3.

Accordingly, camera 50 mounted on mount member 51 and first support member 20 extending upward from attachment portion 24 are arranged to be adjacent to each other in the right-left direction of revolving unit 3, and first support member 20 is arranged inward relative to camera 50. Relative to camera 50, first support member 20 is arranged closer to the center in the right-left direction of revolving unit 3. Relative to camera 50, first support member 20 is arranged further from the right edge of revolving unit 3.

Mount member 51 and attachment portion 26 for attaching second support member 25 of handrail 10 to fuel tank 35 are arranged to be adjacent to each other in the front-rear direction of revolving unit 3. Attachment portion 26 is arranged frontward relative to mount member 51.

Accordingly, camera 50 mounted on mount member 51 and second support member 25 extending upward from attachment portion 26 are arranged to be adjacent to each other in the front-rear direction of revolving unit 3, and second support member 25 is arranged frontward relative to camera 50.

Figure 7:
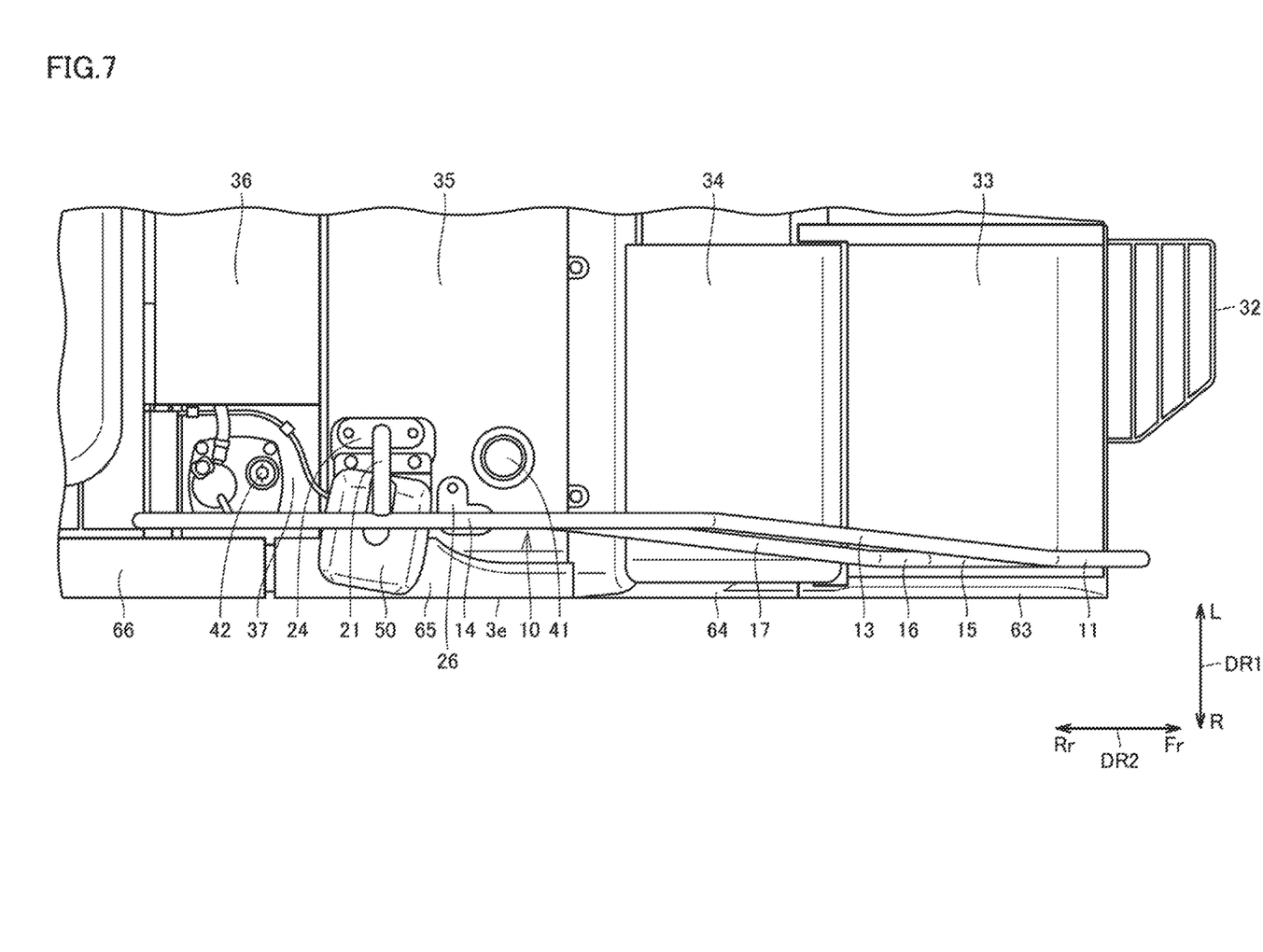
FIG. 7 is a plan view corresponding to the part of the configuration of the hydraulic excavator shown in FIG. 5, with a lid removed therefrom.

FIG. 7 is a plan view corresponding to the part of the configuration of the hydraulic excavator shown in FIG. 5, with lid 38 removed therefrom. With lid 38 shown in FIG. 5 removed, hydraulic oil tank cover 36 is opened to cause the tank housing space in which the hydraulic oil tank is housed to be opened outward. Accordingly, as shown in FIG. 7, a part of hydraulic oil tank 37 can be seen from above.

Hydraulic oil tank 37 includes a hydraulic oil replenishment port 42 for replenishing hydraulic oil tank 37 with hydraulic oil. Hydraulic oil replenishment port 42 is provided in the upper surface of hydraulic oil tank 37. As shown in FIG. 7, removal of lid 38 causes hydraulic oil replenishment port 42 to be exposed outward. An operator can easily replenish hydraulic oil tank 37 with hydraulic oil through exposed hydraulic oil replenishment port 42.

As shown in FIG. 7, first support member 20 and second support member 25 of handrail 10 as well as camera 50 are arranged rearward relative to fuel replenishment port 41 and frontward relative to hydraulic oil replenishment port 42, in the front-rear direction of revolving unit 3. In the front-rear direction of revolving unit 3, first support member 20, second support member 25, and camera 50 are arranged between fuel replenishment port 41 and hydraulic oil replenishment port 42.

A description will be given next of functions and effects of the present embodiment.

Hydraulic excavator 1 of the present embodiment includes camera 50 for confirming safety of an area at the right side of revolving unit 3, and handrail 10 for an operator to grip in a hand when the operator is to access the upper surface of revolving unit 3. As shown in FIG. 5, camera 50 is installed on the right-side lateral edge of the upper surface of revolving unit 3. As shown in FIG. 6, handrail 10 is attached to the upper surface of revolving unit 3.

As shown in FIGS. 2 to 4, handrail 10 includes first oblique portion 13 and first parallel portion 14. First oblique portion 13 and first parallel portion 14 form the first handrail member extending in the front-rear direction of revolving unit 3. Handrail 10 includes first support member 20. First support member 20 supports the first handrail member on revolving unit 3.

Handrail 10 includes front coupling portion 15, second rise portion 16, second oblique portion 17, and second parallel portion 18. Front coupling portion 15, second rise portion 16, second oblique portion 17, and second parallel portion 18 form the second handrail member extending in the front-rear direction of revolving unit 3. Handrail 10 includes second support member 25. Second support member 25 supports the second handrail member on revolving unit 3.

Camera 50 and first support member 20 are arranged to be adjacent to each other in the right-left direction of revolving unit 3, and first support member 20 is arranged inward relative to camera 50.

As first support member 20 is arranged at a position away from the lateral edge of revolving unit 3, a space is formed between first support member 20 and the lateral edge of revolving unit 3. Since camera 50 can be arranged in this space, arrangement of camera 50 is not restricted by first support member 20 of handrail 10. Accordingly, camera 50 can be arranged at an appropriate position on the lateral edge of revolving unit 3.

Since first support member 20 is arranged inward relative to camera 50, first support member 20 is interposed between camera 50 and the passage for access to the upper surface of revolving unit 3. First support member 20 reduces the possibility that an operator passing on the upper surface of revolving unit 3 bumps against camera 50. Camera 50 can therefore be protected appropriately.

As shown in FIG. 6, camera 50 and second support member 25 are arranged to be adjacent to each other in the front-rear direction of revolving unit 3, and second support member 25 is arranged frontward relative to camera 50.

Second support member 25 and first support member 20 are displaced from each other in the front-rear direction of revolving unit 3, and second support member 25 is arranged frontward relative to first support member 20. In addition, second support member 25 and first support member 20 are displaced from each other in the right-left direction of revolving unit 3, and first support member 20 is arranged inward relative to second support member 25. Accordingly, a space is formed rearward of second support member 25 and outward of first support member 20. Since camera 50 can be arranged in this space, arrangement of camera 50 is not restricted by first support member 20 and second support member 25 of handrail 10. Accordingly, camera 50 can be arranged at an appropriate position on the lateral edge of revolving unit 3.

Second support member 25 is arranged frontward relative to camera 50. An operator proceeds along the stepped passage from the front end of revolving unit 3 to access the upper surface of revolving unit 3. As second support member 25 is interposed between camera 50 and the access passage for the operator who accesses from the front end, the possibility that the operator passing on the upper surface of revolving unit 3 bumps against camera 50 can be reduced. Camera 50 can therefore be protected appropriately.

As shown in FIGS. 3, 4, and 6, revolving unit 3 includes fuel tank 35 for storing fuel. First support member 20, second support member 25, and camera 50 are arranged on the upper surface of fuel tank 35. On the upper surface of fuel tank 35 having a large area as seen in plan view, first support member 20, second support member 25, and camera 50 are all arranged in a concentrated manner. Thus, a space for arranging camera 50 can easily be formed outward of first support member 20 and rearward of second support member 25.

As shown in FIG. 7, revolving unit 3 includes hydraulic oil tank 37 for storing hydraulic oil. Fuel tank 35 includes fuel replenishment port 41. Hydraulic oil tank 37 includes hydraulic oil replenishment port 42. In the front-rear direction of revolving unit 3, first support member 20, second support member 25, and camera 50 are arranged between fuel replenishment port 41 and hydraulic oil replenishment port 42.

Fuel replenishment port 41 is used when fuel tank 35 is replenished with fuel. Hydraulic oil replenishment port 42 is used when hydraulic oil tank 37 is replenished with hydraulic oil. In terms of the workability of the work of replenishing fuel tank 35 with fuel and the work of replenishing hydraulic oil tank 37 with hydraulic oil, it is preferable to arrange fuel replenishment port 41 and hydraulic oil replenishment port 42 away from first support member 20 and second support member 25 of handrail 10. As first support member 20, second support member 25, and camera 50 are arranged in a concentrated manner between fuel replenishment port 41 and hydraulic oil replenishment port 42, fuel replenishment port 41 and hydraulic oil replenishment port 42 can appropriately be arranged away from both first support member 20 and second support member 25.

As shown in FIG. 6, revolving unit 3 includes mount member 51 attached to the upper surface of fuel tank 35. Camera 50 is mounted on mount member 51. As shown in FIGS. 2 and 5, revolving unit 3 includes exterior cover 65 laterally covering fuel tank 35. As shown in FIG. 2, exterior cover 65 overlaps mount member 51 as seen in lateral view.

As camera 50 is mounted on mount member 51, camera 50 can be arranged at a higher position and an image captured by camera 50 can be used to monitor a broader area at the right side of revolving unit 3. The fact that mount member 51 is hidden by exterior cover 65 and thus invisible as seen in lateral view enables the design of hydraulic excavator 1 to be improved.

As shown in FIGS. 5 and 7, the first handrail member and the second handrail member overlap each other as seen in plan view. Accordingly, the access passage for an operator that extends from the front end of revolving unit 3 to the top surfaces of fuel tank 35 and hydraulic oil tank cover 36 can be formed to have a greater width.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 hydraulic excavator; 2 travelling unit; 3 revolving unit; 3e lateral edge; 4 work implement; 5 engine compartment; 6 counterweight; 7 cab; 8 center bracket; 10 handrail; 11 first rise portion; 12, 24, 26 attachment portion; 13 first oblique portion; 14 first parallel portion; 15 front coupling portion; 16 second rise portion; 17 second oblique portion; 18 second parallel portion; 19 rear coupling portion; 20 first support member; 21, 22 lateral extension; 23 lateral oblique portion; 25 second support member; 32 step; 33 tool box; 34 reducing agent tank cover; 35 fuel tank; 36 hydraulic oil tank cover; 37 hydraulic oil tank; 38 lid; 41 fuel replenishment port; 42 hydraulic oil replenishment port; 50 camera; 51 mount member; 61, 63, 64, 65, 66 exterior cover

The invention claimed is:
1. A hydraulic excavator comprising:
a revolving unit;
a camera installed on a lateral edge of an upper surface of the revolving unit; and
a handrail attached to the upper surface of the revolving unit,
the handrail including a first handrail member extending in a front-rear direction of the revolving unit, and a first support member supporting the first handrail member on the revolving unit, and
the camera and the first support member being adjacent to each other in a right-left direction of the revolving unit, and the first support member being arranged inward relative to the camera, wherein
the handrail includes a second handrail member arranged below the first handrail member and extending in the front-rear direction of the revolving unit, and a second support member supporting the second handrail member on the revolving unit,
the revolving unit includes a fuel tank for storing fuel,
the first support member, the second support member, and the camera are arranged on an upper surface of the fuel tank,
the revolving unit includes a hydraulic oil tank for storing hydraulic oil,
the fuel tank includes a fuel replenishment port,
the hydraulic oil tank includes a hydraulic oil replenishment port, and
the first support member, the second support member, and the camera are arranged between the fuel replenishment port and the hydraulic oil replenishment port in the front-rear direction of the revolving unit.

2. The hydraulic excavator according to claim 1, wherein the camera and the second support member are adjacent to each other in the front-rear direction of the revolving unit, and the second support member is arranged frontward relative to the camera.

3. The hydraulic excavator according to claim 1, wherein the first handrail member and the second handrail member overlap each other as seen in plan view.

4. The hydraulic excavator according to claim 1, wherein the camera is arranged on the upper surface of the revolving unit without intervention of the first handrail member or the first support member.

5. The hydraulic excavator according to claim 1, further comprising:
a mount member directly attached to the upper surface of the revolving unit, the camera being mounted on the mount member.

6. The hydraulic excavator according to claim 5, wherein the revolving unit includes an exterior cover laterally covering the fuel tank, and
the exterior cover and the mount member overlap each other as seen in lateral view.

* * * * *